United States Patent

[11] 3,600,796

[72] Inventors Horst Gebert;
Silvia Lipka; Martin Meyer, all of Nurnberg, Germany
[21] Appl. No. 790,986
[22] Filed Jan. 14, 1969
[45] Patented Aug. 24, 1971
[73] Assignee International Standard Electric Corporation
New York, N.Y.
[32] Priority Jan. 15, 1968
[33] Germany
[31] P 16 39 432.4

[54] METHOD OF MANUFACTURING ELECTRICAL CAPACITORS
7 Claims, 11 Drawing Figs.

[52] U.S. Cl. ................................................. 29/570,
29/25.42, 29/418, 29/559, 156/60, 156/228, 317/230
[51] Int. Cl. ........................................................ B01f 17/00

[50] Field of Search ............................................ 29/25.42,
418, 559, 25.41, 570; 317/230; 156/60, 228

[56] References Cited
UNITED STATES PATENTS

| | | | |
|---|---|---|---|
| 3,196,323 | 7/1965 | Rogers et al. ................ | 317/230 |
| 3,302,073 | 1/1967 | Broodo ........................ | 29/570 X |
| 3,345,545 | 10/1967 | Bourgault et al. ............ | 317/230 |

*Primary Examiner*—John F. Campbell
*Assistant Examiner*—Carl E. Hall
*Attorneys*—C. Cornell Remsen, Jr., Walter J. Baum, Percy P. Lantzy, Philip M. Bolton, Isidore Togut and Charles L. Johnson, Jr.

ABSTRACT: A capacitor is formed of two metallic anode bodies mounted closely together. A dielectric oxide layer is formed on the bodies over which a semiconductor layer is applied and then a conductive layer is applied to combine the bodies into one unit.

PATENTED AUG 24 1971 3,600,796
FIG. 1a  FIG. 1b  FIG. 1c
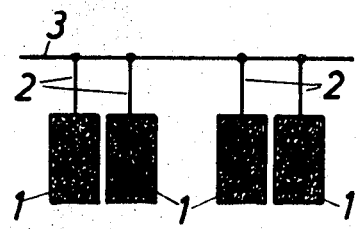
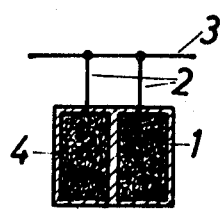
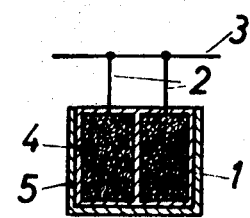
FIG. 2a  FIG. 2b  FIG. 2c  FIG. 2d
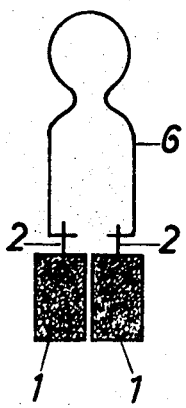
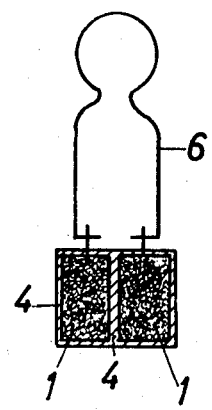
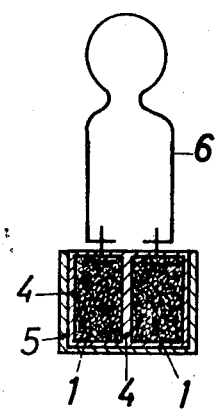
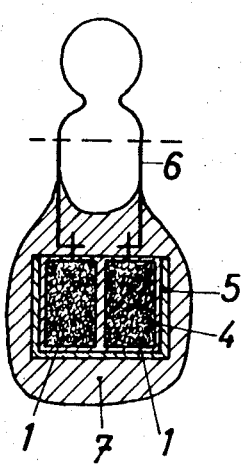
FIG. 3a  FIG. 3b  FIG. 3c  FIG. 3d
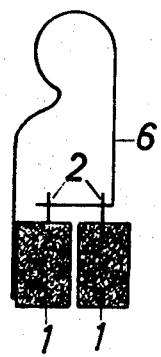
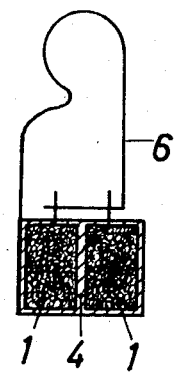
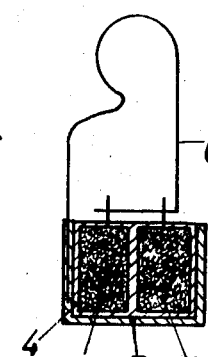
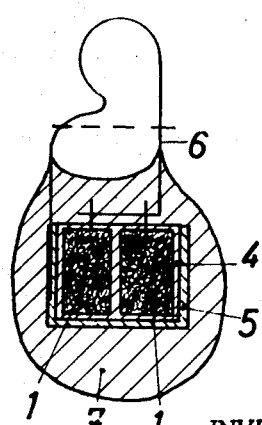
INVENTORS
HORST GEBERT
SILVIA LIPKA
MARTIN MEYER
BY Edward Goldberg
ATTORNEY

METHOD OF MANUFACTURING ELECTRICAL CAPACITORS

BACKGROUND OF THE INVENTION

1. Field of the Invention

The present invention relates to a method for the manufacture of electrical capacitors comprising an anode body of valve metal on which there is applied a dielectric oxide layer carrying a semiconductor layer. On the semiconductor layer there is applied an electrically conducting layer.

The invention is based on the problem of providing a method for the manufacture of such types of electrical capacitors in which, in a simple way, it is possible to obtain a high capacitance or bipolar capacitors respectively.

According to the invention this is accomplished in that at least two anode bodies are used and that these two bodies, are arranged so closely to one another that, with the aid of this layer, the anode bodies are combined to one unit.

2. Description of the Prior Art

As is well known, in the manufacture of capacitors of the above-mentioned type, electrode bodies are formed of a suitable metal such as tantalum, aluminum, niobium, or titanium. For the purpose of achieving a particularly high capacitance per space unit, porous sintered bodies are sued as the anode bodies.

In accordance with a well known method, the anode bodies are coated with a dielectric or insulating oxide layer and, subsequently thereto, a semiconductor layer is produced on the aforementioned oxide layer. The semiconductor layer itself, preferably, consists of a suitable oxide, such as manganese dioxide or lead dioxide. As a rule, the semiconductor layer is produced by decomposing a suitable aqueous solution, for example, in that the anode bodies are dipped into an aqueous manganese nitrate solution, and in that, by a subsequent heating, the manganese nitrate is decomposed to form manganese dioxide.

On to this semiconductor layer there is then applied an electrically conducting layer which may also consist of several partial layers of different substances. For example, a graphite layer is first of all deposited on the manganese dioxide layer, and thereafter, a layer of solder is deposited thereon.

It is also already known to construct electrical capacitors comprising anode bodies of valve metal, in such a way that for one capacitor, several sintered bodies are assembled or combined to form one unit. Thus, for example, it is already known from the German Patent No. 1,101,621 to use several sintered bodies and to connect the current lead-in conductors of valve metal traversing the sintered bodies, to one another, or else to provide one common current lead-in conductor for all of the sintered bodies, in a wire or tape form respectively. In this conventional type of embodiment, however, there are no capacitors employing a semiconductor layer applied on to the anode body, and comprising a conducting layer, but only capacitors employing a liquid electrolyte.

Moreover, it is known from the German Printed Application (DAS) No. 1,215,260, to manufacture an electrical capacitor employing a semiconductor layer, in such a way that manganese dioxide coatings, and on to the latter, electrically conducting contact layers, are applied or deposited onto a tape of the metal at certain spaced relations. Subsequently thereto, the carrier band may be folded in such a way that the conducting layers of the individual units are permitted to come into contact with one another. In this conventional method, capacitor units are also combined to form one single capacitor, but in this particular case one single anode body is used having the shape of a tape or band. This excludes the use of sintered bodies. Moreover, transfer or contact resistances exist between the individual conducting layers positioned on top of each other, because the latter are only brought into contact with one another after having been manufactured or completed.

From the German Patent No. 1,142,967 it is already known to manufacture a capacitor employing a semiconductor layer, in such a way that two sintered bodies engage one another, so that the one sintered body is held in position by the other one. Between the sintered bodies there is arranged a semiconductor layer. For holding the one sintered body against the other one, there is required a certain pressure which is likely to cause a damaging of the semiconductor layer which, under certain circumstances, may penetrate the oxide layer. Finally, the outer sintered body is required to have a relatively complicated shape.

Finally, from the German Printed Application (DAS) 1,213,053 there is known a method for manufacturing electrical capacitors employing a semiconductor layer, in which the individual anode bodies are mounted or fixed to a common wire which, in turn, is supported by a body of ceramic or quartz. The individual anode bodies are then subjected in common to the further steps of the precess including forming the semiconductor layer and the conducting layer. In this conventional method, however, unlike the invention, the individual anode bodies are arranged at such a spaced relation that the applied layers on the anode bodies, do not simultaneously extend to several anode bodies.

From the German Patent No. 1,121,731 there is also known a method of manufacturing small tubular ceramic capacitors in which several small dielectric tubes are positioned next to each other on wires bent to the shape of hairpins, in such a way that the one end which is bent to the form of a loop, will come to lie resiliently against the circumference of the small ceramic tube. By dipping into a solder bath, the ends of the wire are soldered to the small tube. It is in no way intended by this method to connect several units to one another by the applied layers.

SUMMARY OF THE INVENTION

By employing the method according to the present invention, the individual anode bodies can be so arranged next to each other in different ways as to be connected to one another when depositing the layers. Thus, for example, it is possible for the individual anode bodies themselves, or with the aid of lead-in wires and in a known manner, to be fixed or mounted to a common carrier or support, preferably consisting of valve metal. In so doing, and in accordance with the invention, they are arranged in groups such that when producing or applying the layers, the individual groups are combined to form a mechanical and electrical unit.

Another possibility for carrying out the method according to the invention, resides in the fact of employing resilient wires bent to the shape of hairpins, to which the anode bodies are mounted. The employment of such resilient wire clamps which, later on, also serve as connecting or terminal wires, has already been proposed. However, it was always only possible to mount one anode body to one wire clamp.

In the accompanying drawings the method according to the invention is shown with reference to examples of embodiment. The drawings show the products which are obtained after employing the individual steps of the process. BRIEF DESCRIPTION OF THE DRAWINGS FIG. 1 shows the steps of a process in the course of which several anode bodies are arranged in a group on one common support, and FIGS. 2 and 3 show modifications of the method according to the invention, in which a wire clamp having the shape of a hairpin, is used as a means for supporting the anode bodies. DESCRIPTION OF THE PREFERRED EMBODIMENTS In FIGS. 1a, 1b and 1c there are shown the products of three steps of process, by which there are produced capacitors according to the invention. First of all, as is shown in FIG. 1a, several anode bodies are fixed or mounted in groups on a common support 3 which, for example, just like the anode of bodies 1 and the lead-in wires 2, may consist of valve metal. The anode bodies 1, as is schematically shown in FIG. 1, may be tantalum sintered bodies. According to the invention, two such sintered bodies are arranged so closely next to each other that, in the course of producing or applying the layers, the two anode bodies will be combined to form one unit. First of all the anode bodies are subjected to an electrical forming process, for producing a thin dielectric oxide layer which is not shown. On one hand, the oxide layer must completely cover the anode bodies 1 on all sides and, on the other hand, this oxide layer penetrates the anode body so that there is not yet effected a connection of the two anode bodies to form one unit. Only after the semiconductor layer 4 has been applied around and between the bodies, as is shown in FIG. 1b, are the bodies combined to form one unit. FIG. 1c shows the process subsequent to the application of the conducting layer 5. If necessary, it is sufficient if the anode bodies are combined to form one unit only by the layer 5. This conducting layer 5 partially surrounding the bodies, may consist of several layers of different substances, or else several conducting layers may be deposited on to one another. Preferably, the extreme conducting layer is manufactured from a low-melting alloy, thus resulting in a particularly good connection of the anode bodies. Subsequently thereto, the body may be separated from the common support 3 by cutting the wires 2 whereupon, as a rule, there are still attached the connecting wires, and the capacitor is built into a suitable envelope or casing. In so doing, the two anode bodies which are connected to one another, may be connected together electrically, while a second connection is applied to the outer conducting layer 5. In this way there is obtained a capacitor of higher capacity by employing individual but uniform anode bodies. Of course, it is also possible, when employing a suitable support, such as a tape or band, to combine more than two anode bodies to form one unit, in that they are suitably arranged spaced close to one another.

One modification of the method according to the invention is shown in FIGS. 2 and 3. According to this modification, wire clamps 6 which are bent to the shape of hairpins, are used as the supports for the anode bodies 1, with the ends of said wire clamps being connected to the lead-in wires 2. The connecting point, for example, is designed in a crosswise fashion with projecting ends, as has been previously proposed, so that a sealing compound applied by way of dipping or immersion, will adhere better.

According to FIG. 2, the wire clamps 6 are resiliently designed on both limbs, whereas in the type of the embodiment according to FIG. 3, the wire clamps are designed so that only one end has substantial properties of resilience. The wire clamp 6 in the type of embodiment according to FIG. 2, may be so dimensioned that a small space will remain between the individual anode bodies 1. It is also possible, however, to press the anode bodies resiliently against each other, which does not necessarily hinder the placement of a complete dielectric layer on both anode bodies. Subsequently to the application of the semiconductor layer 4, there will be obtained an arrangement of the type as shown in FIG. 2b'. *The final product as obtained subsequently to the application of the conducting layer 5, is shown in FIG. 2c.* Finally, as shown in FIG. 2d, a plastic layer 7 may be applied by way of dipping. The individual limbs of the wire clamp 6 are then separated at the point indicated by the dashed line. In this way a bipolar electrical capacitor will be produced.

In the type of embodiment according to FIG. 3 the two anode bodies 1 are mounted in common on the same limb of the wire clamp 6, whereas the other limb of said wire clamp is lying close to the outside of the one anode body, or is arranged at a short distance therefrom. Care must be taken, however, that the limb of the wire clamp is not applied to the anode body during the forming process. FIG. 3b in turn, shows the condition subsequent to the application of the semiconductor layer 4, and FIG. 3c, shows the condition subsequent to the application of the conducting layer 5. Finally, the resulting capacitor may again be provided with a plastic envelope 7, as is shown in FIG. 3d. The application of the plastic material is preferably done by way of dipping. Subsequently thereto, the loop of the wire clamp 6 is cut off. In the resultant capacitor, the anode bodies are connected in parallel, so that there will be obtained a polar capacitor of double capacity.

We claim:

1. A method of manufacturing electrical capacitors including supporting two metallic anode bodies in a closely spaced relationship forming a dielectric oxide layer on said bodies, applying a semiconductor layer over the oxide layer on and between said bodies and applying an electrically conducting layer over said semiconductor layer on said bodies to simultaneously coat and join said spaced anode bodies to form one unit.

2. The method according to claim 1, including of said anode bodies a group providing on a common support before applying said semiconductor and electrically conducting layers.

3. The method according to claim 2, including forming said support of the same metal as said anode bodies.

4. The method according to claim 2, including supporting said bodies in said spaced relationship by means of a hairpin wire support.

5. The method according to claim 4, including biasing said bodies toward one another by means of a resilient hairpin support.

6. The method according to claim 1, including forming said bodies of sintered tantalum and applying a semiconductor layer of manganese dioxide.

7. The method according to claim 2, including supporting said two anode bodies in said spaced relationship on one end of a hairpin wire support and resiliently biasing the other end toward the outer conducting layer.